United States Patent
Li et al.

(10) Patent No.: US 10,747,918 B2
(45) Date of Patent: Aug. 18, 2020

(54) BACKWARD DISCRETE STATE EVENT DRIVEN POWER ELECTRONICS SIMULATION METHOD, POWER ELECTRONICS SIMULATION COMPUTATION APPARATUS AND COMPUTER-READABLE STORAGE MEDIUM

(71) Applicant: TSINGHUA UNIVERSITY, Beijing (CN)

(72) Inventors: Boyang Li, Beijing (CN); Zhengming Zhao, Beijing (CN); Tian Tan, Beijing (CN); Yi Yang, Beijing (CN); Liqiang Yuan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 385 days.

(21) Appl. No.: 15/808,047

(22) Filed: Nov. 9, 2017

(65) Prior Publication Data

US 2018/0357340 A1 Dec. 13, 2018

(30) Foreign Application Priority Data

Jun. 7, 2017 (CN) .......................... 2017 1 0424981

(51) Int. Cl.
*G06F 30/20* (2020.01)
*G06F 30/367* (2020.01)
(Continued)

(52) U.S. Cl.
CPC ............ *G06F 30/20* (2020.01); *G06F 30/367* (2020.01); *G06F 2111/10* (2020.01); *G06F 2119/06* (2020.01)

(58) Field of Classification Search
CPC .... G06F 30/20; G06F 30/367; G06F 2119/06; G06F 2111/10
See application file for complete search history.

(56) References Cited

U.S. PATENT DOCUMENTS 7,640,154 B1 * 12/2009 Clune ..................... G06F 30/20
703/22
9,507,888 B1 * 11/2016 Aggarwal ................. G06F 8/34
(Continued)

OTHER PUBLICATIONS

Migoni, Gustavo, Ernesto Kofman, and François Cellier. "Quantization-based new integration methods for stiff ordinary differential equations." Simulation 88, No. 4 (2012): 387-407. (Year: 2012).*

(Continued)

*Primary Examiner* — Rehana Perveen
*Assistant Examiner* — Chuen-Meei Gan
(74) *Attorney, Agent, or Firm* — Hauptman Ham, LLP (57) ABSTRACT

A backward discrete state event driven power electronics simulation method includes simulation initialization and a k-th simulation step, k≥0. The k-th simulation step includes obtaining a system state equation at the k-th step. The k-th simulation step further includes determining alternative quantized values for each of state variables at a k+1-th step. The k-th simulation step further includes setting up a finite state machine to determine quantized values for the state variables at the k+1-th step one by one. The k-th simulation step further includes calculating a vector of derivatives based on the quantized values at the k+1-th step and the system state equation. The k-th simulation further includes determining the time of the k+1-th simulation step based on occurrence times of events.

14 Claims, 4 Drawing Sheets

(51) Int. Cl.
  *G06F 111/10* (2020.01)
  *G06F 119/06* (2020.01)

(56) References Cited

U.S. PATENT DOCUMENTS

2012/0045013 A1* 2/2012 Chen .................. G05B 5/01
                                                    375/295
2019/0179988 A1* 6/2019 Malik ................. G06F 8/35

OTHER PUBLICATIONS

Kofman, Ernesto. "Discrete event simulation of hybrid systems." SIAM Journal on Scientific Computing 25, No. 5 (2004): 1771-1797. (Year: 2004).*
Li, Boyang, Zhengming Zhao, Yi Yang, Yicheng Zhu, and Zhujun Yu. "A novel simulation method for power electronics: Discrete state event driven method." CES Transactions on Electrical Machines and Systems 1, No. 3 (2017): 273-282. (Year: 2017).*
Fernández, Joaquín, and Ernesto Kofman. "A stand-alone quantized state system solver for continuous system simulation." Simulation 90, No. 7 (2014): 782-799. (Year: 2014).*
Nutaro, James, and Bernard Zeigler. "On the stability and performance of discrete event methods for simulating continuous systems." Journal of Computational Physics 227, No. 1 (2007): 797-819. (Year: 2007).*
Bergero, Federico, and Ernesto Kofman. "PowerDEVS: a tool for hybrid system modeling and real-time simulation." Simulation 87, No. 1-2 (2011): 113-132. (Year: 2011).*
Kofman E, Junco S., Quantized-state systems: a DEVS Approach for continuous system simulation [J], Simulation Transactions of the Society for Modeling & Simulation International, 2001, 18(3)123-132.
Migoni G, Kofman E, Cellier F. Quantization-based new integration methods for stiff ordinary differential equations [J], Simulation, 2012, 88(4):387-407.
Office Action dated Apr. 23, 2019 and English translation from corresponding application No. CN 201710424981.6.
Search Report dated Apr. 15, 2019 from corresponding application No. CN 201710424981.6.
Notification to Grant Patent Right for Invention dated Jul. 2, 2019 and English translation from corresponding application No. CN 201710424981.6.

* cited by examiner

Equivalent circuit of IGBT model

Figure 4A

Equivalent circuit of diode model

Figure 4B

$T_{B+}$ waveform of TR-BDF2 method, time consuming is 204.5s

Figure 5A

$T_{B+}$ waveform of QSS when $k=0.8\%$, time consuming is 0.84s

Figure 5B

$T_{B+}$ waveform of QSS when $k=0.6\%$, time consuming is 1.02s

Figure 5C

$T_{B+}$ waveform of QSS when $k=0.4\%$, time consuming is 2.97s

Figure 5D $T_{B+}$ waveform of QSS when $k=0.2\%$, time consuming is 6.79s

Figure 5E $T_{B+}$ waveform of BDSED when $k=0.8\%$, time consuming is 1.45s

BACKWARD DISCRETE STATE EVENT DRIVEN POWER ELECTRONICS SIMULATION METHOD, POWER ELECTRONICS SIMULATION COMPUTATION APPARATUS AND COMPUTER-READABLE STORAGE MEDIUM

FIELD

Some embodiments of the present invention relate to the field of power electronics simulation, and more specifically, to a simulation method of power electronics converter system, a power electronics simulation computation apparatus, and a computer-readable storage medium.

BACKGROUND

Computer numerical simulation is of great importance in the analysis of non-ideal characteristics of power electronics systems. However, for power electronics systems taking account of non-ideal models of power switches and stray parameters, the simulation models have characteristics of multi-time scale, discontinuity, non-linearity, and strong stiffness. When solving such systems, traditional numerical algorithms based on the discretization of time (such as trapezoidal method, Runge-Kutta method, etc.) have the following difficulties. There is a difficulty in determining a step size. Fixed-step algorithms may lead to wrong solutions due to error accumulation; while variable-step algorithms will spend much computation time on adjusting step size, and may choose too-small time steps in order to capture the trajectories of fast state variables, which causes the simulation difficult to go forward. Theses algorithms are inefficient. Power electronics systems always contain many discrete events, which leads to discontinuities in mathematics. These algorithms, whether fixed-time step algorithms or variable-step algorithms, cannot integrate across the discontinuity points, and the iterations to find discontinuity points will consume a large amount of computation time and slow down the simulation. Discrete-time algorithms may lead to spurious oscillations or divergence in the simulation due to multi-time scale.

In order to help overcome the shortcomings of traditional discrete-time algorithms, in 2001, Ernesto Kofman et al. proposed an algorithm based on the discretization of event, named Quantized State Systems (QSS) algorithm. (See Kofman E, Junco S., Quantized-state systems: a DEVS Approach for continuous system simulation [J], Simulation Transactions of the Society for Modeling & Simulation International, 2001, 18(3):123-132, which is incorporated herein by reference in its entirety.) Different from classical discrete-time algorithms, in QSS, every state variable is quantized first by means of quantization function (Q-function), then the vector of derivatives is calculated according to the values of Q-functions rather than the values of state variables themselves, and the time which takes from one quantized state to a next quantized state can be calculated to push the simulation. QSS has some advantages over classical time-driven algorithms. QSS has excellent mathematical properties, such as good stability and convergence, because global errors in QSS algorithm can be constrained by the quantum. There is no iteration in QSS because all state variables are approximated by piecewise constant Q function. Time intervals between two points of discontinuity can be easily calculated by simple linear operations, which means higher efficiency. QSS is a variable-step method by nature. The time from one quantized state to a next quantized state is determined by the derivatives of the state variables and the relevant quantum. When the derivative is large, the time step calculated is a small value. On the contrary, a small derivative results in a large time step. Thus, no extra computation is needed for finding a suitable step. All the above advantages indicate that QSS possesses potential in the simulation of power electronics systems.

In spite of the advantages mentioned above, the efficiency and stability of the QSS algorithm when dealing with stiff systems are not satisfactory. Power electronics systems are typical stiff systems because they involve a large number of switches and multi-time scale processes. If stiff integrator algorithms are not used when solving stiff systems, the maximum step size permitted will be determined by the smallest modulus of the Jacobian matrix's eigenvalues rather than the vector of the derivatives, and the step size must be very small to satisfy the demand of stability, which will significantly slow down the speed of simulation. All discrete-time stiff integrator algorithms are implicit backward algorithms, while QSS is an explicit forward one, and QSS does not perform well in efficiency and stability when solving systems with strong stiffness.

Ernesto Kofman et al. proposed a backward QSS algorithm (BQSS). In BQSS, a group of quantized values of the state variables are selected as the vector Q for the next computation step, based on which the signs of the derivatives calculated can make every state variable approach its quantized value at the next step (See Migoni G, Kofman E, Cellier F. Quantization-based new integration methods for stiff ordinary differential equations [J], Simulation, 2012, 88(4):387-407, which is incorporated herein by reference in its entirety). As an implicit event-driven algorithm, the main problem of BQSS is how to select the vector Q correctly and efficiently. The derivative of a state is variable is not only affected by its own quantized value but also by the quantized values of other state variables. Thus, the selection of quantized values of state variables affects each other. At each computation step, there are two alternatives for the quantized value of each state variable, and thus enumeration is not feasible in high dimensional systems due to a huge number of combinations. The existing implementation schemes of BQSS are all based on enumeration, and do not take into account the interactions and constraints among quantized values. Thus, in complex systems like power electronics systems, these implementation schemes cannot find the correct vector Q, and the few existing examples are all simple low dimensional systems. There is no effective scheme for complex high dimensional systems yet.

SUMMARY

An object of at least one embodiment of the prevent invention is to provide a simulation method for efficiently solving power electronics converter systems with strong stiffness, which can improve the simulation speed and numeral stability when solving the power electronics converter systems with strong stiffness.

The embodiments of at least one aspect of the present invention provide a backward discrete state event driven (BDSED) power electronics simulation method, including simulation initialization and a k-th simulation step, k≥0.

The k-th simulation step includes:
obtaining a system state equation at the k-th step;
determining alternative quantized values for each of state variables at a k+1-th step; setting up a finite state machine to determine quantized values for the state variables at the k+1-th step one by one;

calculating a vector of derivatives based on the quantized values at the k+1-th step and the system state equation; and determining the time of the k+1-th simulation step based on occurrence times of events.

In at least one embodiment, the obtaining of the system state equation includes discretizing each state variable $x_i$ by means of its quantization function. The quantization function is:

$$Q_i(t) = \begin{cases} Q_i(t^-) + \Delta q_i & \text{if } x_i(t) - Q_i(t^-) = \Delta q_i \\ Q_i(t^-) - \Delta q_i & \text{if } Q_i(t^-) - x_i(t) = \varepsilon_i \\ Q_i(t^-) & \text{otherwise} \end{cases}$$

wherein i=1, 2, ..., n, n is the number of the state variables, $\Delta q_i$ is the size of discrete segments, $\varepsilon_i$ is a hysteresis width for preventing endless loop of $Q_i$.

The obtaining of the system state equation further includes determining system status based on a vector $Q^{(k)}$ consisting of the quantized values of the state variables at the k-th step, circuit topological information and controllers' signals, and obtaining the system state equation at the k-th step.

In at least one embodiment, the determining of the alternative quantized values includes finding two adjacent partition points $q_i^{(k)+}$ and $q_i^{(k)-}$ nearest to state variable $x_i^{(k)}$, as the alternative quantized values at the k+1-th step, i.e., alternative values of $Q_i^{(k+1)}$:

$$q_i^{(k)-} = \begin{cases} q_{is} - \Delta q_i & \text{if } x_i(t) == q_{is}, s \in \{1, 2 \ldots m\} \\ \text{floor}((x_i^{(k)} - x_i^{(0)})/\Delta q_i) \cdot \Delta q_i + Q_i^{(0)} & \text{otherwise} \end{cases}$$

$$q_i^{(k)+} = \begin{cases} q_i^{(k)-} + 2 \cdot \Delta q_i & \text{if } x_i(t) == q_{is}, s \in \{1, 2 \ldots m\} \\ q_i^{(k)-} + \Delta q_i & \text{otherwise} \end{cases}$$

wherein $q_{is}$ is the s-th partition point of the i-th state variable, and in is the number of discrete segments.

In at least one embodiment, the setting up of the finite state machine includes setting up a finite state machine including four states, and in each state, dynamically decoupling and reducing the dimensionality of the system based on extrema of the vector of derivatives, a Jacobian matrix of the system state equation, and independent variables' impact on the extrema, so as to determine the quantized value $Q_i^{(k+1)}$ for state variable $x_i$ at the k+1-th step one by one.

The simulation method implemented based on the finite state machine according to some embodiments of the present invention makes full use of the sparsity and the mathematical properties of state equations of power electronics converter systems. In each state, the state variables whose quantized values have not been determined are checked, and the decoupling and dimensionality reduction of the system are conducted dynamically so as to decouple the state variables of the system, and determine the quantized values of the state variables at the k+1-th step one by one, while ensuring that signs of the derivatives of those already determined will not be affected by the state variables whose quantized values are to be determined. Therefore, the method can be implemented in complex high dimensional systems efficiently.

In at least one embodiment, the calculating of the vector derivatives includes substituting the quantized values at the k+1-th step to the system state equation instead of the state variables to calculate the vector of derivatives. The calculating of the vector derivatives further includes post-processing the calculated vector of derivatives, wherein the derivatives' moduli are limited based on electrical stress of the power electrics system.

In at least one embodiment, the post-processing of the calculated vector derivatives includes limiting derivatives' moduli with an upper limit $\dot{x}_{max}$:

$$\dot{x}_{max} = \beta \cdot \max\left\{ \frac{|U|_{max}}{L_{min}}, \frac{|I|_{max}}{C_{min}} \right\}$$

wherein $|U|_{max}$ and $|I|_{max}$ are the steady-state peak values of capacitor voltage and inductor current of the system, Lmin and Cmin are minimum values of equivalent inductance and equivalent capacitance, and $\beta$ is a limiting factor.

By determining the maximum amplitude of derivative of each state variable based on the electrical stress in the power electronics system and limiting the moduli of the derivatives, the high frequency oscillation can be effectively suppressed while ensuring is the accuracy of the computation.

In at least one embodiment, the determining of the time of the k+1-th simulation step includes determining the occurrence times of events, and selecting the earliest time as a time stamp for the k+1-th simulation step. The events include state variable events and non-state variable events. The state variable events include state variable $x_i$ reaching the quantized value at the k+1-th step, $Q_i^{(k+1)}$, and the occurrence times of the state variable events are calculated based on the vector of derivatives. The non-state variable events include one or more of the following events: inputs or loads changing, open or closed loop system sending switch instructions, turn-on or turn-off processes of uncontrolled devices, transient processes of switches.

In at least one embodiment, the determining of the time of the k+1-th simulation step further includes updating values of the state variables in case an event occurs.

By extending event types to include not only state variable events, i.e., a state variable reaches the partition point, but also non-state variable events, the simulation method is capable of solving various types of power electronics systems.

Embodiments of at least one aspect of the present invention provides a power electronics simulation computation apparatus, including a memory and a processor. The memory has stored program codes which, when executed, cause the processor to perform the backward discrete state event driven power electronics simulation method.

Embodiments of at least one aspect of the present invention provides a computer-readable storage medium having stored thereon program codes which can be executed by one or more processors to perform the backward discrete state event driven power electronics simulation method.

In general, embodiments of the present invention, individually, have some or all of the following advantages. The vector Q can be selected effectively in high dimensional systems. A finite state machine is set up in this method, which makes full is use of the mathematical properties of state equations and the sparsity of the Jacobian matrix of power electronics converter systems. During simulation, the system is decoupled and its dimensionality is reduced dynamically. Enumeration is avoided in this method, and once a state variable's quantized value is determined, the positive or negative sign of its derivative will not be affected by those state variables whose quantized values are to be determined. Therefore, the method can be implemented in complex high dimensional systems effectively. The method has a good ability of suppressing numerical oscillations. The BDSED simulation method proposed by the present invention is an implicit backward method, which has better numerical stability than forward methods. With the same discrete intervals, BDSED can effectively suppress numerical oscillations and thus has higher simulation accuracy. The method has high efficiency when solving stiff systems. On the one hand, there is no need to locate the points of discontinuity and repeatedly adjust step size in the BDSED method due to its discrete-event driven mechanism. On the other hand, due to its good numerical stability, BDSED can select wider discrete intervals for state variables, and suppress numeral oscillations so as to avoid unnecessary events, so that the amount of computation steps can be significantly reduced. As compared to conventional discrete-time algorithms and QSS, BDSED can solve stiff systems more efficiently and consume less time. The invention is more adaptive to power electronics systems. Some embodiments of the present invention provide a complete simulation method, including various processes of the simulation. BDSED is fully combined with power electronics systems in aspects such as extension of event types, implementation scheme and post processing of derivatives, which makes BDSED an universal tool for various types of power electronics systems.

BRIEF DESCRIPTION OF THE DRAWINGS

The above and other features and advantages of the present invention can be better understood from the detailed description of the preferred embodiments in conjunction with the drawings, wherein.

DETAILED DESCRIPTION

Embodiments of the present invention will be described in detail in conjunction with the accompanying drawings. These embodiments are only illustrative and for explaining the present invention, but shall not be considered as a limitation thereto. In the figures, the same or similar reference numbers denote the same or similar elements.

Figure 1:
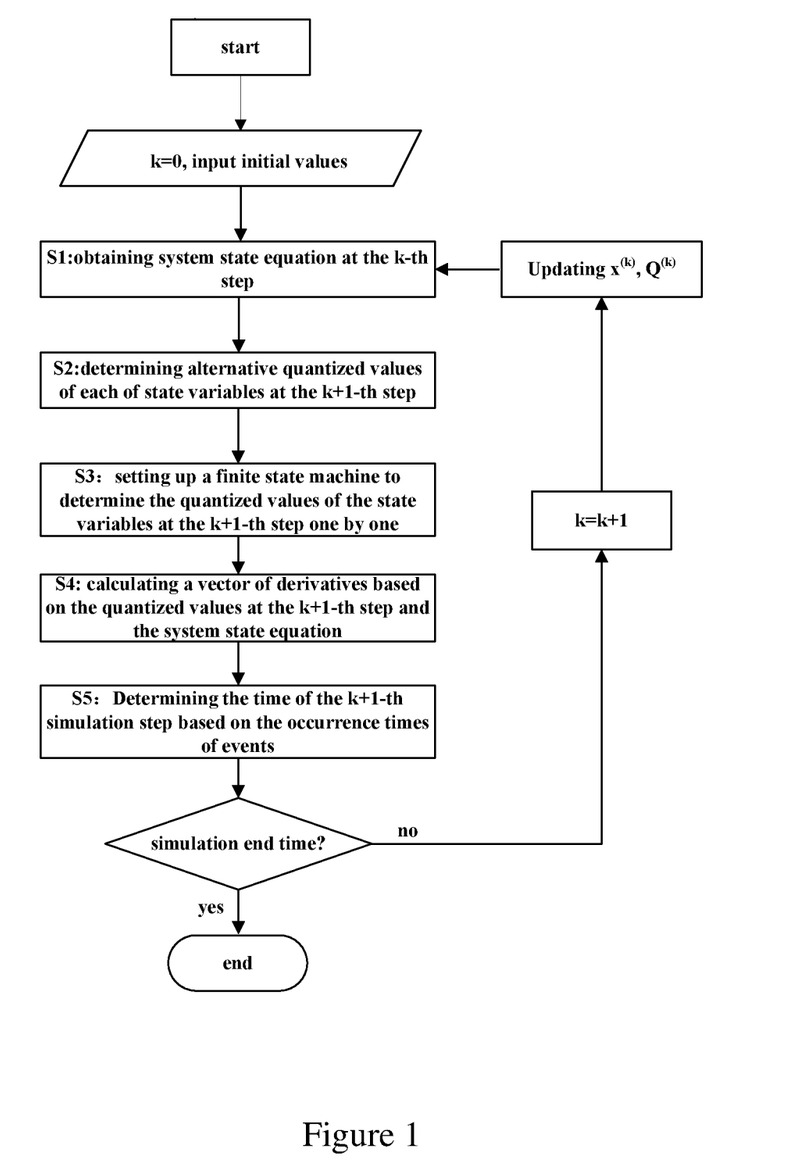
FIG. 1 is a flowchart of the backward discrete state event driven (BDSED) power electronics simulation method according to at least one embodiment of the present invention.

FIG. 1 is a flowchart of BDSED power electronics simulation method according to at least one embodiment of the present invention.

A power electronics converter system is neither a continuous system nor an entirely discrete system. Instead, a power electronics converter system is a typical to hybrid system, which can be seen as a piecewise continuous system divided by discrete events. Between adjacent points of discontinuity, the system is continuous and can be described by the following state equation:

$$\dot{x} = Ax + Bu \quad (1)$$

wherein Jacobian matrix A and input matrix B are constant between adjacent points of is discontinuity, x is the vector of the system's state variables, and u is the vector of input sources. Generally in power electronics systems, u usually contains active sources and controlled sources, while x usually contains capacitor's voltage and inductor's current.

In FIG. 1, during the initialization stage of the simulation, k is set to 0, and $x^{(0)}$, $Q^{(0)}$, and $\Delta q$ are input. $x^{(0)}$ are initial values of state variables, $Q^{(0)}$ are the initial quantized values of state variables and $\Delta q$ are sizes of discrete segments.

The k-th simulation step includes obtaining a system state equation of the k-th step (S1).

Before calculation, each state variable $x_i$ is discretized by means of the state variable's quantization function $Q_i$. For example, $x_i$ can be split into many discrete segments via a series of evenly spaced partition points:

$$Q_i(t) = \begin{cases} Q_i(t^-) + \Delta q_i & \text{if } x_i(t) - Q_i(t^-) = \Delta q_i \\ Q_i(t^-) - \Delta q_i & \text{if } Q_i(t^-) - x_i(t) = \varepsilon_i \\ Q_i(t^-) & \text{otherwise} \end{cases} \quad (2)$$

wherein i=1, 2, . . . , n (n is the number of state variables), $\varepsilon_i$ is the hysteresis width which is introduced to prevent endless loop of $Q_i$, and $\Delta q_i$ is the size of discrete segment. $Q_i$ is a piecewise constant function since $\Delta q_i$ is constant in the discussed embodiment of the invention. Those skilled in the art may understand that the principle of the present invention can also apply to the situations where $\Delta q_i$ is adjusted dynamically.

Based on a vector $Q^{(k)}$ consisting of quantized values of state variables $x_i$ of the k-th step, topological information of the circuit and controllers' signals, the system status is determined, and the Jacobian matrix A, the input matrix B and controlled sources of $u^{(k)}$ can be calculated, while active sources of $u^{(k)}$ can be extracted directly from circuit information. Thus, the system state equation at the k-th step is obtained.

The k-th simulation step further includes determining the alternative quantized values for each of the state variables $x_i$ at the k+1-th step (S2).

Specifically, the two adjacent partition points $q_i^{(k)+}$ and $q_i^{(k)-}$ nearest to state variable $x_i^{(k)}$ are found to be alternative quantized values of $x_i$ at the k+1-th step.

Denote $x_i^{(k)}$ as the value of state variable $x_i$ at the k-th step, then the state variable's quantized value at the k+1-th step, $Q_i^{(k+1)}$, has two alternatives: the two adjacent partition points nearest to $x_i^{(k)}$, denoted as $q_i^{(k)+}$ and $q_i^{(k)-}$ respectively. $q_i^{(k)+}$ and $q_i^{(k)-}$ can be calculated according to equation (3):

$$q_i^{(k)-} = \begin{cases} q_{is} - \Delta q_i & \text{if } x_i(t) == q_{is}, s \in \{1, 2 \ldots m\} \\ \text{floor}((x_i^{(k)} - x_i^{(0)})/\Delta q_i) \cdot \Delta q_i + Q_i^{(0)} & \text{otherwise} \end{cases} \quad (3)$$

$$q_i^{(k)+} = \begin{cases} q_i^{(k)-} + 2 \cdot \Delta q_i & \text{if } x_i(t) == q_{is}, s \in \{1, 2 \ldots m\} \\ q_i^{(k)-} + \Delta q_i & \text{otherwise} \end{cases}$$

wherein $q_{is}$ is the s-th partition point of the i-th state variable, and in is the number of discrete segments.

The k-th simulation step further includes setting up a finite state machine to determine the quantized values of state variables at the k+1-th step, $Q_i^{(k+1)}$, one by one (S3).

The purpose of this step is to find the correct vector $Q^{(k+1)}$, based on which the derivatives calculated can make every state variable $x_i^{(k)}$ approach its quantized value $Q_i^{(k+1)}$.

The BDSED method proposed by embodiments of the present invention uses the vector $Q^{(k+1)}=(Q_1^{(k+1)}, Q_2^{(k+1)}, \ldots Q_n^{(k+1)})^T$ instead of $x^{(k)}$ to calculate derivatives. The value of $Q_i^{(k+1)}$ is one of $q_i^{(k)+}$ and $q_i^{(k)-}$. The vector $Q^{(k+1)}$ is selected so that derivatives calculated can make every state variable $x_i^{(k)}$ approach its quantized value $Q_i^{(k+1)}$, that is:

$$\hat{x}^{(k)} \cdot (Q_i^{(k+1)} - x_i^{(k)}) \geq 0 \quad (4)$$

The property described above is defined as the coherence of orientation, and each component of the derivative vector can be expressed as:

$$\hat{x}^{(k)} = f_i(Q^{(k+1)}, U^{(k)}) \quad (5)$$

where $f_i$ is the expression for calculating the derivative of $x_1$ obtained based on the state equation. For some state variables, the coherence of orientation cannot be satisfied no matter what the vector $Q^{(k+1)}$ is:

$$\hat{x}^{(k)} \cdot (Q_i^{(k+1)} - x_i^{(k)}) < 0, \forall Q^{(k+1)} \quad (6)$$

Derivatives of such state variables can be set to 0. Since Jacobian matrix A is a constant matrix, and the input vector has been determined before each computation step, $f_i(Q^{(k+1)}, U^{(k)})$ is a multivariate linear function, in which components of the vector $Q^{(k+1)}$ are independent variables. $f_i(Q^{(k+1)}, U^{(k)})$ can be described as:

$$f_i(Q^{(k+1)}, U^{(k)}) = a_{i1}Q_1^{(k+1)} + a_{i2}Q_2^{(k+1)} \ldots + a_{in}Q_n^{(k+1)} + C_i \quad (7)$$

where $a_{ij}$ is the element of Jacobian matrix A at row i, column j, and $C_i$ is a constant value determined by input sources and can be calculated when input sources are obtained. For each independent variable $Q_i^{(k+1)}$, there are only two alternative values: $q_i^{(k)+}$ or $q_i^{(k)-}$. The maximum value and the minimum value of the multivariate linear function can be obtained easily, and each time an independent variable's value is determined, the maximum value and the minimum value of the function will change. With this property, a finite state machine is set up in the present invention, and four states are designed. In each state, the system is decoupled and its dimensionality is reduced dynamically based on the extrema, Jacobian matrix, and independent variables' impact on the extrema, so as to determine the quantized value of each state variable $x_i$ at the k+1-th step, $Q_i^{(k+1)}$, one by one. Once a state variable's quantized value is determined, the sign of its derivative, positive or negative, will not be affected by those whose quantized values are not determined yet. Moreover, the state variables, for which coherence of orientation cannot be satisfied, are also found.

The k-th simulation step further includes calculating the vector of derivatives based on the quantized values at the k+1-th step and the system state equation (S4).

Specifically, the vector $Q^{(k+1)}$ is substituted to the state equation instead of $x^{(k)}$ to calculate the vector of derivatives. In addition, according to at least one embodiment, the vector of derivatives is post-processed.

Firstly, the vector $Q^{(k+1)}$ is substituted to the state equation to calculate the vector of derivatives:

$$\hat{x}^{(k)} = AQ^{(k+1)} + Bu^{(k)} \quad (8)$$

The state variables, for which coherence of orientation cannot be satisfied, have been found above, and the corresponding derivatives are modified to 0. In some cases, the derivative modulus of a certain state variable is too large so that the simulation time step is too small. Frequent occurrences of such situation will result in unexpected high frequency oscillation in the simulation result. Therefore, according to at least one embodiment, the derivative moduli are limited to suppress high frequency oscillation, so as to obtain a final vector of derivatives. State variables in power electronics systems are inductors' currents and the capacitors' voltages, and the physical meanings of their derivatives correspond to the electrical stress. Therefore, the potential maximum electrical stress in the system is used to limit derivatives' moduli. The goal of the modulus limiting processing is to effectively suppress high frequency oscillation while ensuring computation accuracy.

The k-th simulation step further includes determining the time of simulation computation of the k+1-th step, $t^{(k+1)}$, based on the times at which events occur (S5).

With the final vector of derivatives obtained at step S4, the time interval for each state variable to reach its next partition point, that is, $Q_i^{(k+1)}$, is calculated.

Moreover, according to an embodiment of the invention, the types of events are largely enriched. Besides the state variable related events discussed above (that is, a % state variable reaches its next partition point $Q_i^{(k+1)}$), some other types of events, including inputs or loads changing, open or closed loop system sending switch instructions, turn-on process or turn-off process of uncontrolled devices, transient processes of switches and so on, are also taken into the whole event-driven mechanism. The extension of event types makes BDSED a universal method to simulate various kinds of power electronics systems.

The time at which the earliest event occurs is selected as the time stamp for the computation of the next step, then the system time and the values of state variables are updated, and the k-th simulation step is finished.

If the time of simulation computation of the k+1-th step as determined does not reach a preset simulation end time, then the simulation proceeds to the k+1-th step, otherwise the simulation terminates.

As can be understood from the above description, computation of each step will only be triggered at the time when an event occurs, and the simulation process is completely driven by discrete events.

To further illustrate the BDSED simulation method of embodiments of the invention and verify effects of the BDSED simulation method, a circuit of a three phase two-level converter with star-connection resistance-inductance load which considers non-ideal device characteristics and parasitic parameters is used as the simulation example. The circuit topology of the simulation example is shown in FIG. 2.

Figure 2:
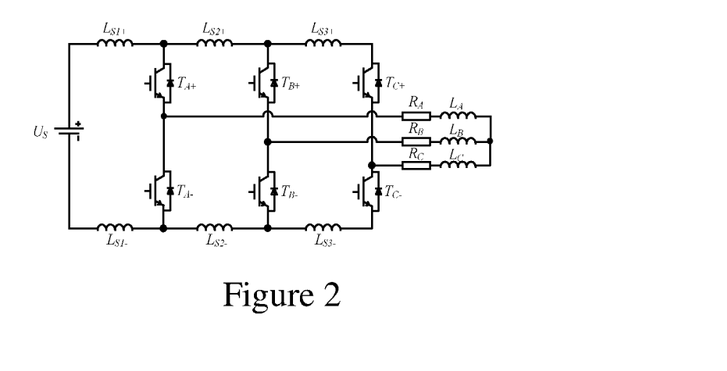
FIG. 2 is a circuit topology of a simulation example.
Figure 4A:
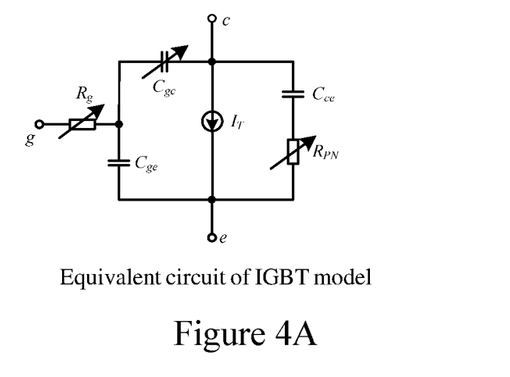
FIG. 4A is an IGBT model usable in the simulation example in FIG. 2.
Figure 4B:
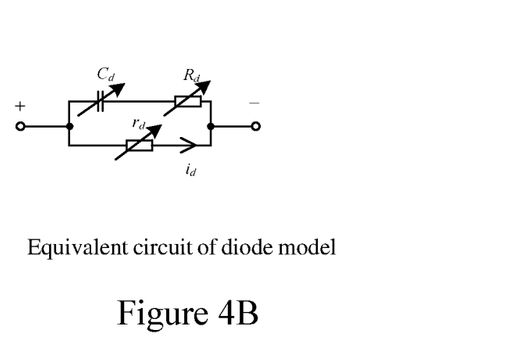
FIG. 4B is a diode model usable in the simulation example in FIG. 2.
Figures 5A, 5B:
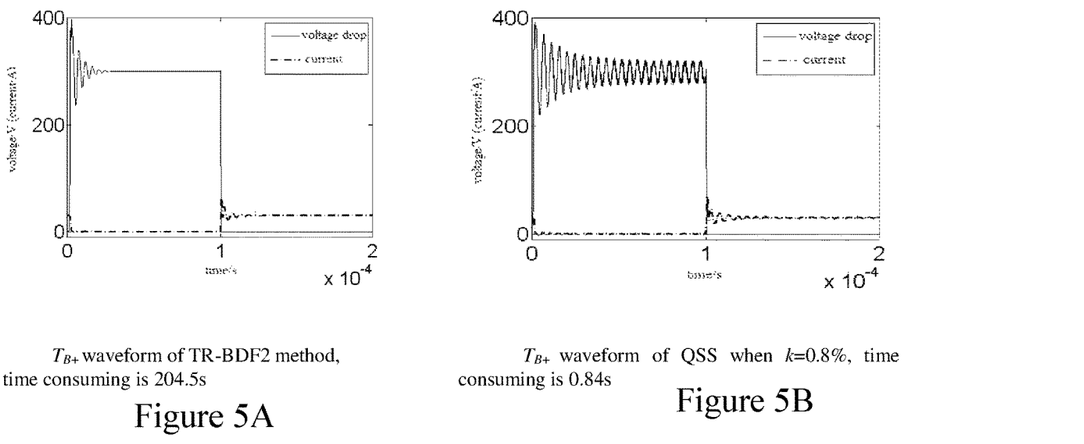
FIGS. 5A-5F are waveforms of $T_{B+}$ and time consuming using different simulation algorithms for the simulation example in FIG. 2.
Figures 5C, 5D:
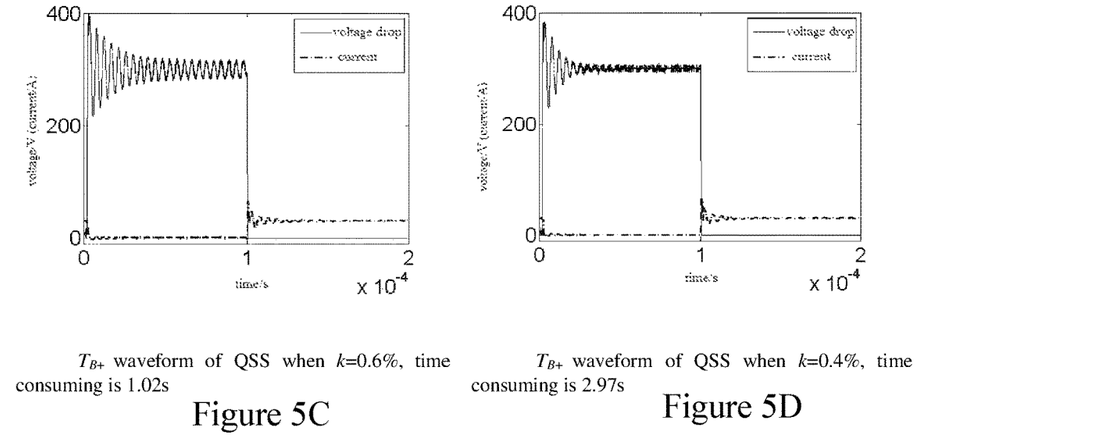
Figures 5E, 5F:
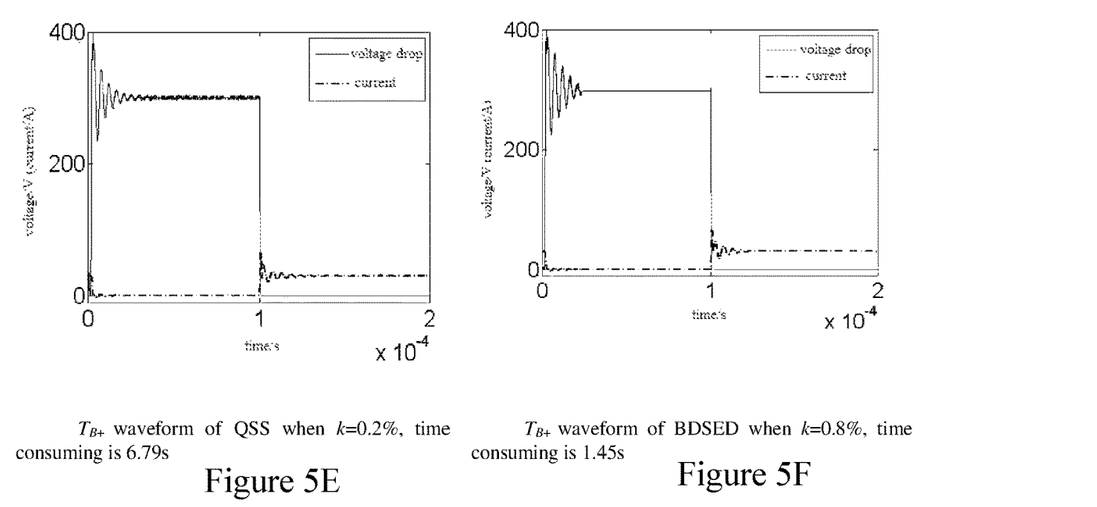

The non-ideal model of IGBTs used in the simulation example of FIG. 2 is in FIG. 4A. Based on the switching characteristics of IGBT, the switching-on and switching-off transient processes are divided into five stages respectively, and the values of parameters $R_g$, $C_{gc}$, $R_{PN}$ and the expression of $I_T$ are changed in different stages. The model of diodes can be equivalent to a variable resistor $r_d$ in parallel with a variable RC bunch, as in FIG. 4B. $L_{S1+}$, $L_{S2+}$, $L_{S3+}$, $L_{S1-}$, $L_{S2-}$, $L_{S3-}$ are parasitic inductors with the same inductance, and the load is symmetric three-phase resistance-inductance load.

Figure 3:
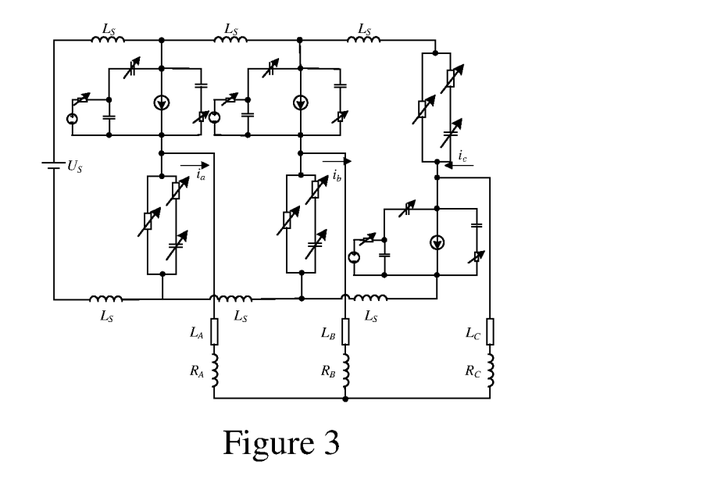
FIG. 3 is a simplified circuit topology of the simulation example in FIG. 2.

The simulation process contains a single switching cycle, in which $T_{A+}$ remains at a steady-off state and $T_{C+}$ remains at a steady-on state, and $T_{B+}$ goes through both switching-on and switching-off transient processes. The switching cycle is 0.2 s, and the duty ratio is 50%. Because the inductance of load's inductors is larger than that of parasitic inductors, the direction of load current can be considered unchanged during is switching transient process. Thus, the simulation circuit can be simplified by reserving only commutating circuit through which load current flows, as in FIG. 3, which consists of the upper arm's IGBT and the lower arm's diodes in phase A/B, and the upper arm's diodes and the lower arm's IGBT in phase C. In the simplified circuit, input variables contain the gate driving voltage $U_{g\_x}$ of each IGBT and the current $I_{T\_x}$ of each current source. Variable parameters of the model contain $R_{g\_x}$ (the gate resistance of the IGBT), $R_{PN\_x}$ (the base resistance of the IGBT), $C_{gc\_x}$ (the junction capacitance of the IGBT), $I_{T\_x}$ (the equivalent current source of the IGBT), $C_{d\_x}$ (the dynamic capacitance of the diode), $R_{d\_x}$ (the dynamic resistance of the diode) and $r_{d\_x}$ (the static resistance of the diode), and "_x" denotes the corresponding serial number of IGBTs or diodes. State variables of the system are independent capacitor voltages and inductor currents. There are three independent capacitor voltages in each IGBT model and one independent capacitor voltage in each diode model. Among the three-phase parasitic inductors, the currents of $L_{S1+}$ and $L_{S1-}$, $L_{S2+}$ and $L_{S2-}$, and $L_{S3+}$ and $L_{S3-}$ are equal to each other respectively. Therefore, there are only three independent inductor currents. For three-phase load inductors, since the sum of the currents is 0, there are only two independent inductor currents. Thus, the whole circuit contains twelve independent capacitor voltages and five independent inductor currents in total, and is a 17-dimension system.

Referring again to FIG. 1, the simulation computation of the k-th step (k) includes calculating the system state equation of the k-th step (S1).

Before computation, the state variables are discretized according to the above equation (2). The above-mentioned variable parameters are calculated based on vector $Q^{(k)}$ and controllers' signals to judge whether the circuit topology is changed. Then the circuit node list is updated and the system state equation is obtained automatically by computer program.

The simulation computation of the k-th step further includes finding the two adjacent partition points $q_i^{(k)+}$ and $q_i^{(k)-}$ nearest to $x_i^{(k)}$ as the alternative values of $Q_i^{(k+1)}$ (S2).

For each of the 17 state variables, the two adjacent partition points $q_i^{(k)+}$ and $q_i^{(k)-}$ are calculated according to equation (3). It can be derived that:

$$(q_i^{(k)-} - x_i^{(k)}) \cdot (q_i^{(k)+} - x_i^{(k)}) < 0 \quad (9)$$

The calculation results at this step are stored in an array, which will be used at the subsequent steps.

The simulation computation of the k-th step further includes setting up a finite state machine to determine the quantized values of the state variables $x_i$ of the k+1-th step one by one and obtain $Q^{(k+1)}$ (S3).

Two 17*17 matrixes, maxQ and minQ, are initialized. Denoting maxq$_i$ and minq$_i$ as the i-th row vector of maxQ and minQ, respectively, maxq$_i$ is the combination of $Q_i^{(k+1)}$ which makes the derivative of the i-th state variable maximum, while minq$_i$ is the combination which makes the derivative of the i-th state variable minimum:

$$\mathrm{maxQ}_{(i,j)} = \begin{cases} q_j^{(k)+} & \text{if } a_{ij} \geq 0 \\ q_j^{(k)-} & \text{otherwise} \end{cases} \quad (10)$$

-continued $$\mathrm{minQ}_{(i,j)} = \begin{cases} q_j^{(k)-} & \text{if } a_{ij} \geq 0 \\ q_j^{(k)+} & \text{otherwise} \end{cases}$$

A state variable index set, Xset={1, 2, 3 ... n}, n=17, and two empty sets, X1 and X2, are also initialized. Each time a state variable's quantized value at the next step is determined (the state variable's corresponding index is denoted as i), the i-th column vector of matrix maxQ and matrix minQ are also be adjusted, then the index i is removed from Xset, and the number of independent variables of $f_i(Q^{(k+1)}, U^{(k)})$ is reduced by 1. When Xset becomes empty, the quantized values of 17 state variables are determined and thus the vector $Q^{(k+1)}$ is obtained.

State 1: For each i∈Xset, the signs of its corresponding $f_i(\mathrm{maxq}_i, U^{(k)})$ and $f_i(\mathrm{minq}_i, U^{(k)})$ are calculated and checked respectively. If $f_i(\mathrm{maxq}_i, U^{(k)}) \leq 0$, the corresponding quantized value $Q_i^{(k+1)}$ will be determined as $q_i^{(k)-}$, the values of the i-th column of matrix maxQ and matrix minQ are all replaced with $q_i^{(k)-}$, and element i will be removed from Xset; while if $f_i(\mathrm{minq}_i, U^{(k)}) \geq 0$, the corresponding quantized value $Q_i^{(k+1)}$ will be is determined as $q_i^{(k)+}$, the values of the i-th column of matrix maxQ and matrix minQ are all replaced with $q_i^{(k)+}$, and likewise, element i will be removed from Xset. If there is a state variable(s) determined in this state, the next state will remain at State 1, and a new round of check is made. Otherwise, the next state will jump to State 2.

State 2: For each i∈Xset, if the diagonal element $a_{ii}$ in matrix A is equal to or larger than 0, then two vectors, maxq̂$_i$ and minq̂$_i$, will be constructed as follows, wherein the j-th component of the two vectors can be described as:

$$\mathrm{max}\hat{q}_i(j) = \begin{cases} \mathrm{maxq}_i(j) & \text{if } j \neq i \\ \mathrm{minq}_i(j) & \text{otherwise} \end{cases} \quad (11)$$

$$\mathrm{min}\hat{q}_i(j) = \begin{cases} \mathrm{minq}_i(j) & \text{if } j \neq i \\ \mathrm{maxq}_i(j) & \text{otherwise} \end{cases}$$

Like State 1, the signs of $f_i(\mathrm{max}\hat{q}_i, U^{(k)})$ and $f_i(\mathrm{min}\hat{q}_i, U^{(k)})$ are calculated and checked. If $f_i(\mathrm{max}\hat{q}_i, U^{(k)}) \leq 0$, the corresponding quantized value $Q_i^{(k+1)}$ will be determined as $q_i^{(k)-}$, the values of the i-th column of matrix maxQ and matrix minQ are all replaced with $q_i^{(k)-}$, and element i will be removed from Xset; while if $f_i(\mathrm{min}\hat{q}_i, U^{(k)}) \geq 0$, the corresponding quantized value $Q_i^{(k+1)}$ will be determined as $q_i^{(k)+}$, the values of the i-th column of matrix maxQ and matrix minQ are all replaced with $q_i^{(k)+}$, and likewise, element i will be removed from Xset. If there is a state variable(s) determined in this state, the next state will jump back to State 1. Otherwise, the next state will jump to State 3.

State 3: For each i∈Xset, if the diagonal element $a_{ii}$ in matrix A is smaller than 0, like State 2, two vectors, maxq̂$_i$ and minq̂$_i$, will be constructed. The signs of $f_i(\mathrm{max}\hat{q}_i, U^{(k)})$ and $f_i(\mathrm{min}\hat{q}_i, U^{(k)})$ are checked. If the following conditions are met:

$$f_i(\mathrm{max}\hat{q}_i, U^{(k)}) \leq 0 \,\&\&\, f_i(\mathrm{min}\hat{q}_i, U^{(k)}) \geq 0 \quad (12)$$

it indicates that the coherence of orientation of state variable $x_i$ cannot be satisfied no matter what $Q^{(k+1)}$ is. In such case, the corresponding derivative of $x_i$ is set to 0, the corresponding quantized value $Q_i^{(k+1)}$ will be set to $Q_i^{(k)}$, and maxQ, minQ are updated. The index i will be removed from Xset and added to X1. If there is a state variable(s) determined in this state, the next state will jump back to State 1. Otherwise, the next state will jump to State 4.

State 4: The index s is selected from the remaining elements of Xset:

$$s = \arg\min(f_i(\max q_i, U^{(k)}) - f_i(\min q_i, U^{(k)})) \quad (13)$$

wherein i∈Xset. A vector $\hat{Q}^{(k+1)}$ is constructed, the j-th component of which is:

$$\hat{Q}^{(k+1)}(j) = \begin{cases} Q_j^{(k+1)} & \text{if } j \notin Xset \\ Q_j^{(k)} & \text{otherwise} \end{cases} \quad (14)$$

If $f_s(\hat{Q}^{(k+1)}, U^{(k)}) \geq 0$, the corresponding quantized value $Q_s^{(k+1)}$ will be set to $q_s^{(k)+}$. Otherwise, $Q_s^{(k+1)}$ will be set to $q_s^{(k)-}$. Similarly, the values of the i-th column of matrix maxQ and matrix minQ are all replaced with $Q_s^{(k+1)}$, s will be removed from Xset and added to X2. The next state will jump back to State 1.

The stop condition for the algorithm is that Xset becomes empty, which means that the values of $Q_i^{(k+1)}$ have all been determined and the vector $Q^{(k+1)}$ is obtained.

The simulation computation of the k-th step further includes calculating the vector of derivatives, $\dot{x}^{(k)}$ (S4).

First, an intermediate vector $\hat{\dot{x}}^{(k)}$ is calculated according to equation (8) based on $Q^{(k+1)}$ obtained by the state machine. After $\hat{\dot{x}}^{(k)}$ is obtained, the components, of which indices are included in X1 and X2, are modified. Meanwhile, in order to suppress high frequency oscillation, a upper limit $\dot{x}_{max}$ is used to limit derivative modulus, and $\dot{x}_{max}$ is determined by the electrical stress of the power electronics converter system. Specifically, $\dot{x}_{max}$ is related to the voltage or current peaks, and equivalent capacitance and inductance values:

$$\dot{x}_{max} = \beta \cdot \max\left\{\frac{|U|_{max}}{L_{min}}, \frac{|I|_{max}}{C_{min}}\right\} \quad (15)$$

where $|U|_{max}$ and $|I|_{max}$ are the steady-state peak values of capacitor voltage and inductor current of the system, and β is the limiting factor. To ensure simulation accuracy, β must be larger than 1. Increasing β can reduce the impacts of limitation of derivative amplitudes on simulation accuracy, but increasing β also weakens the ability to suppress oscillation. Thus, trial and error may be needed to obtain a proper value of β. Finally, the vector of derivatives $\dot{x}^{(k)}$ can be described as:

$$\dot{x}^{(k)}(j) = \begin{cases} 0 & \text{if } j \in X1 \\ 0 & \text{if } j \in X2, \hat{\dot{x}}^{(k)}(j) \cdot (Q_j^{(k+1)} - x_j^{(k)}) < 0 \\ \min(|\hat{\dot{x}}^{(k)}(j)|, \dot{x}_{max}) \cdot \text{sgn}(\hat{\dot{x}}^{(k)}(j)) \end{cases} \quad (16)$$

The simulation computation of the k-th step further includes determining the time at which the next calculation occurs based on the times at which events occur, so as to complete the computation of the k-th step and push forward the simulation (S5).

Based on the vector of derivatives obtained at step S4, the time interval for each state variable to reach its next partition point, $Q_i^{(k+1)}$, can be calculated:

$$\Delta t_i^{(k)} = \begin{cases} (Q_i^{(k+1)} - x_i^{(k)})/\dot{x}_i^{(k)} & \text{if } \dot{x}_i^{(k)} > 0 \\ (Q_i^{(k+1)} - \varepsilon_i - x_i^{(k)})/\dot{x}_i^{(k)} & \text{if } \dot{x}_i^{(k)} < 0 \\ +\infty & \text{if } \dot{x}_i^{(k)} = 0 \end{cases} \quad (17)$$

Each time there is a state variable $x_i$ reaching its next partition point, which means a discrete event, the values of all state variables need to be updated. Besides state variable events, some other types of events, including inputs or loads changing, open or closed loop system sending switch instructions, the turn-on or turn-off process of uncontrolled devices, transient process of switches and so on, are also taken into the whole event-driven mechanism. The state equation will be updated whenever an event is occurs. The computation will only be triggered at a time when an event happens, and the simulation process is completely driven by discrete events.

Denote $t^{(k)}$ as the time stamp of the computation of the k-th step, $t^{(k+1)}$ as the time stamp of the computation of the k+1-th step, $\Delta t^{(k)}$ as the time interval between two steps, and $x^{(k+1)}$ as the vector of state variables at the k+1-th step. $\Delta t^{(k)}$, $t^{(k+1)}$ and $x^{(k+1)}$ can be calculated by the following equation:

$$\Delta t^{(k)} = \min\{\Delta t_i^{(k)}, \Delta t_e\}$$

$$t^{(k+1)} = t^{(k)} + \Delta t^{(k)}$$

$$x^{(k+1)} = x^{(k)} + \dot{x}^{(k)} \cdot \Delta t^{(k)} \quad (18)$$

where $\Delta t_e$ is the time interval between present simulation time and the time when the earliest one of the non-state variable events (other types of events as discussed above) occurs. Then the k-th simulation step is finished and the simulation process makes a step forward. The simulation process is pushed forward by repeating the above steps until the simulation end time is reached.

Analysis of Simulation Results

The BDSED method proposed by at least one embodiment the present invention is compared with four stiff ODE algorithms based on discrete time (the tolerance relative error is set to 0.4% to obtain accurate simulation waves) and QSS on a MATLAB platform, and all these methods are written with in-language of MATLAB. In order to make BDSED and QSS stable and accurate, the size of discrete segments and the steady amplitudes of the state variables should have an equal proportion. Denote k as the proportional coefficient:

$$k = \frac{\Delta q_i}{\max|Q_i|} \times 100\% (i = 1, 2, \ldots, 17) \quad (19)$$

The size of discrete segments of state variables is similar to the step size in traditional discrete time algorithms. As k decreases, the discrete segment will become smaller, which means finer division of state variables, and higher accuracy and stability of the method. However, more events will occur and the simulation will be slower. FIGS. 5A-5F are the simulation results of $T_{B+}$ and time consuming using different simulation algorithms including ode23tb, the fastest of traditional ODE algorithms, QSS and BDSED. As indicated in FIGS. 5A-5F, BDSED according to at least one embodiment of the present invention can select the vector $Q^{(k+1)}$ efficiently in complex high dimensional systems and obtain accurate waveforms. For QSS, when k=0.8%, there is severe numerical oscillation in the simulation results because of too large discrete segment, which influences the numerical stability. When k=0.2%, there is still a little numerical oscillation in steady stage. For BDSED, oscillation can be suppressed effectively, there is no oscillation in simulation results even when k=0.8%. Comparing FIG. 5E with FIG. 5F, the effectiveness of BDSED is verified. Although BDSED is more complex and will take more computation time for a single step, the discrete segment of BDSED can be set wider because BDSED has a strong ability to suppress numerical oscillation. Therefore, the amount of events and the total time consuming of BDSED are obviously less than those of QSS. Table 1 shows the efficiency of different simulation algorithms.

TABLE 1

Comparison between the simulation speeds of BDSED, QSS, and traditional discrete time algorithm

| Algorithm | Number of simulation steps of single switching cycle | Total time consuming of single switching cycle | Average time consuming per step |
|---|---|---|---|
| Variable order numerical differentiation (ode15s) | $2.200 * 10^6$ | 271.2 s | $1.23 * 10^{-4}$ |
| Improved Rosen formula (ode23s) | $2.200 * 10^6$ | 534.9 s | $2.43 * 10^{-4}$ |
| Trapezoidal formula implemented by free interpolation (ode23t) | $2.237 * 10^6$ | 263.4 s | $1.18 * 10^{-4}$ |
| TR-BDF2 (ode23tb) | $2.200 * 10^6$ | 204.5 s | $0.93 * 10^{-4}$ |
| QSS (k = 0.2%) | $2.446 * 10^5$ | 6.79 s | $2.73 * 10^{-5}$ |
| BDSED (k = 0.8%) | $1.356 * 10^4$ | 1.45 s | $1.07 * 10^{-4}$ |

As indicated in Table 1, BDSED is more effective than traditional discrete time algorithms and QSS when solving rigid systems. On the one hand, BDSED can select the vector $Q^{(k+1)}$ correctly and efficiently, and time consuming per step of BDSED is close to that of traditional discrete time algorithms like TR-BDF2 and so on. On the other hand, BDSED can obviously reduce the amount of simulation steps, so total time consuming of BDSED is much less than that of QSS and traditional discrete time algorithms, and BDSED has higher efficiency and numerical stability when solving stiff systems, which indicates that BDSED has great potential in the simulation of power electronic systems.

In conclusion, a backward discrete state event driven (BDSED) simulation method based on the Backward Quantized State System (BQSS) numerical algorithm is proposed by the invention. For resolving the problem that BDSED method based on BQSS is difficult to implement in complex high dimensional systems, an implementation scheme based on finite state machine is proposed. In addition, BDSED is more adaptive to power electronics systems. Embodiments of the present invention have combined the numerical algorithm with power electronics systems more tightly by extension of event types and post processing of derivatives, which makes BDSED an universal tool for various types of power electronics systems. BDSED is tested in a 17-dimension converter circuit with non-ideal device models. Simulation results show that BDSED based on finite state machine can efficiently select the combination of quantized values, and its simulation efficiency is obviously higher than QSS as well as traditional discrete time ODE methods when solving stiff systems.

Figure 6:
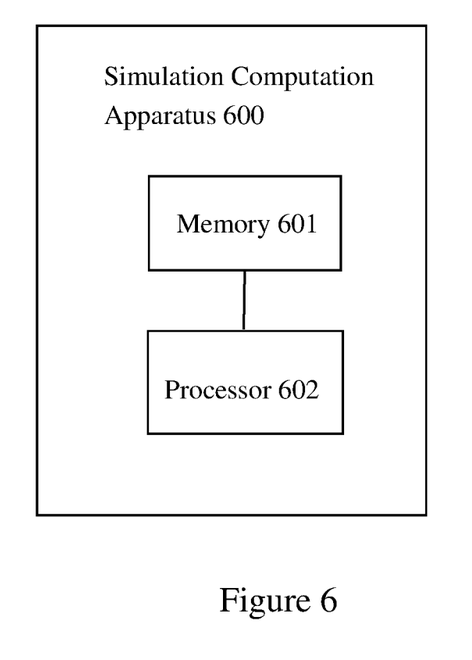
FIG. 6 is a system diagram of a simulation computation apparatus according to at least one embodiment of the present invention.

FIG. 6 is a diagram of a simulation computation apparatus 600 according to at least one embodiment of the present invention. The simulation computation apparatus 600 includes a memory 601 and a processor 602. The memory 601 has stored therein simulation program, which, when executed, causes processor 602 to perform the backward discrete state event driven (BDSED) power electronics simulation method as described above.

Embodiments of the present invention can also be implemented as a computer-readable storage medium. The computer-readable storage medium can store program instructions, which can be executed by one or more processors to perform the simulation method of the embodiment of the present invention. The computer-readable storage medium may include, e.g., magnetic or optical medium such as fixed or movable disks, magnetic tape, CD-ROM, DVD-ROM, CD-R, CD-RW, DVD-R, DVD-RW or Blue Ray disk. The computer-readable storage medium may include volatile or non-volatile storage medium, such as RAM, ROM, flash memory, USB memory, etc. The computer-readable storage medium may also include microelectromechanical system (MEMS), and storage medium accessible via communication media such as network or wireless link.

Embodiments of the present invention have been described in conjunction with the drawings. Embodiments described above are only illustrative but not intended to limit the scope of the present invention. Those skilled in the art may make various modifications, equivalent replacement and improvements without departing the spirit and principle of the present invention. The protection scope of the present invention are is defined by the appended claims only.

The invention claimed is:

1. A backward discrete state event driven power electronics simulation method, including simulation initialization and a k-th simulation step, k≥0,
wherein the k-th simulation step includes:
obtaining a system state equation at the k-th step;
determining two alternative quantized values for each of state variables at a k+1-th step, the state variables include capacitor voltage and inductor current;
setting up a finite state machine to determine quantized values for the state variables at the k+1-th step one by one, wherein the quantized value for each state variable is determined as one of the two alternative quantized values for that state variable,
including:
setting up a finite state machine including four states, and in each state, dynamically decoupling and reducing the dimensionality of the system based on extrema of derivatives, a Jacobian matrix of the system state equation, and independent variables' impact on the extrema, so as to determine the quantized values for the state variables at the k+1-th step one by one;
calculating a vector of derivatives based on the quantized values at the k+1-th step and the system state equation, wherein the calculating of the vector of derivatives includes:
substituting the quantized values at the k+1-th step to the system state equation instead of the state variables to calculate the vector of derivatives; and
post-processing the calculated vector of derivatives, wherein the derivatives' moduli are limited based on electrical stress of the power electronics system; and
determining the time of the k+1-th simulation step based on occurrence times of events.

2. The backward discrete state event driven power electronics simulation method according to claim 1, wherein the obtaining of the system state equation comprises:
discretizing each state variable $x_i$ by means of its quantization function, wherein the quantization function is:

$$Q_i(t) = \begin{cases} Q_i(t^-) + \Delta q_i & \text{if } x_i(t) - Q_i(t^-) = \Delta q_i \\ Q_i(t^-) - \Delta q_i & \text{if } Q_i(t^-) - x_i(t) = \varepsilon_i \\ Q_i(t^-) & \text{otherwise} \end{cases}$$

wherein t is a simulation time step, i=1, 2, ..., n, n is the number of the state variables, $\Delta q_i$ is the size of discrete segments, $\varepsilon_i$ is a hysteresis width for preventing endless loop of $Q_i$; and determining system status based on a vector $Q^{(k)}$ consisting of the quantized values of state variables at the k-th step, circuit topological information and external controllers' signals, and obtaining the system state equation at the k-th step.

3. The backward discrete state event driven power electronics simulation method according to claim 1, wherein the determining of the two alternative quantized values includes:

finding two adjacent partition points $q_i^{(k)+}$ and $q_i^{(k)-}$ nearest to state variable $x_i^{(k)}$, as the two alternative quantized values at the k+1-th step, i.e., two alternative values of $Q_i^{(k+i)}$:

$$q_i^{(k)-} = \begin{cases} q_{is} - \Delta q_i & \text{if } x_i(t) == q_{is}, s \in \{1, 2 \ldots m\} \\ \text{floor}\left((x_i^{(k)} - x_i^{(0)})/\Delta q_i\right) \cdot \Delta q_i + Q_i^{(0)} & \text{otherwise} \end{cases}$$

$$q_i^{(k)+} = \begin{cases} q_i^{(k)-} + 2 \cdot \Delta q_i & \text{if } x_i(t) == q_{is}, s \in \{1, 2 \ldots m\} \\ q_i^{(k)-} + \Delta q_i & \text{otherwise} \end{cases}$$

wherein $q_{is}$ is the s-th partition point of the i-th state variable, and m is the number of discrete segments.

4. The backward discrete state event driven power electronics simulation method according to claim 1, wherein:
the post-processing of the vector of derivatives comprises limiting derivatives' moduli with an upper limit $\dot{x}_{max}$:

$$\dot{x}_{max} = \beta \cdot \max\left\{\frac{|U|_{max}}{L_{min}}, \frac{|I|_{max}}{C_{min}}\right\}$$

wherein $|U|_m$ and $|I|_{max}$ are the steady-state peak values of capacitor voltage and inductor current of the system, Lmin and Cmin are minimum values of equivalent inductance and equivalent capacitance, and β is a limiting factor.

5. The backward discrete state event driven power electronics simulation method according to claim 1, wherein the determining of the time of the k+1-th simulation step includes:
determining the occurrence times of events, and selecting the earliest time as a time stamp for the k+1-th simulation step,
wherein the events include state variable events and non-state variable events,
the state variable events include state variable $x_i$ reaching the quantized value at the k+1-th step, $Q_i^{(k+1)}$ and the occurrence times of the state variable events are calculated based on the vector of derivatives,
the non-state variable events include one or more of the following events: inputs or loads changing, open or closed loop system sending switch instructions, turn-on process or turn-off process of uncontrolled devices, and transient processes of switches.

6. The backward discrete state event driven power electronics simulation method according to claim 5, wherein the determining of the time of the k+1-th simulation step further includes updating values of the state variables in case an event occurs.

7. A power electronics simulation computation apparatus, including:
a memory configured to store instructions; and
a processor connected to the memory, wherein the processor is configured to execute the instructions for:
simulation initialization; and
a k-th simulation step, k≥0,
wherein the k-th simulation step includes:
obtaining a system state equation at the k-th step;
determining two alternative quantized values for each of state variables at a k+1-th step, the state variables include capacitor voltage and inductor current;
setting up a finite state machine to determine quantized values for the state variables at the k+1-th step one by one, wherein the quantized value for each state variable is determined as one of the two alternative quantized values for that state variable,
including:
setting up a finite state machine including four states, and in each state, dynamically decoupling and reducing the dimensionality of the system based on extrema of derivatives, a Jacobian matrix of the system state equation, and independent variables' impact on the extrema, so as to determine the quantized values for state variables at the k+1-th step one by one;
calculating a vector of derivatives based on the quantized values at the k+1-th step and the system state equation, wherein the processor is configured to calculate the vector of derivatives by:
substituting the quantized values at the k+1-th step to the system state equation instead of the state variables to calculate the vector of derivatives; and
post-processing the calculated vector of derivatives, wherein the derivatives' moduli are limited based on electrical stress of the power electronics system; and
determining the time of the k+1-th simulation step based on occurrence times of events.

8. The power electronics simulation computation apparatus according to claim 7, wherein processor is configured to obtain the system state equation by:
discretizing each state variable $x_i$ by means of its quantization function, wherein the quantization function is:

$$Q_i(t) = \begin{cases} Q_i(t^-) + \Delta q_i & \text{if } x_i(t) - Q_i(t^-) = \Delta q_i \\ Q_i(t^-) - \Delta q_i & \text{if } Q_i(t^-) - x_i(t) = \varepsilon_i \\ Q_i(t^-) & \text{otherwise} \end{cases}$$

wherein t is a simulation time step, 1=1, 2, ..., n, n is the number of the state variables, $\Delta q_i$ is the size of discrete segments, $\varepsilon_i$ is a hysteresis width for preventing endless loop of $Q_i$; and determining system status based on a vector $Q^{(k)}$ consisting of the quantized values of state variables at the k-th step, circuit topological information and external controllers' signals, and obtaining the system state equation at the k-th step.

9. The power electronics simulation computation apparatus according to claim 7, wherein processor is configured to determine the two alternative quantized values by:

finding two adjacent partition points $q_i^{(k)+}$ and $q_i^{(k)-}$ nearest to state variable $x_i(k)$, as the two alternative quantized values at the k+1-th step, i.e., two alternative values of $Q_i^{(k+1)}$:

$$q_i^{(k)-} = \begin{cases} q_{is} - \Delta q_i & \text{if } x_i(t) == q_{is}, s \in \{1, 2 \ldots m\} \\ \text{floor}((x_i^{(k)} - x_i^{(0)})/\Delta q_i) \cdot \Delta q_i + Q_i^{(0)} & \text{otherwise} \end{cases}$$

$$q_i^{(k)+} = \begin{cases} q_i^{(k)-} + 2 \cdot \Delta q_i & \text{if } x_i(t) == q_{is}, s \in \{1, 2 \ldots m\} \\ q_i^{(k)-} + \Delta q_i & \text{otherwise} \end{cases}$$

wherein $q_{is}$ is the s-th partition point of the i-th state variable, and m is the number of discrete segments.

10. The power electronics simulation computation apparatus according to claim 7, wherein the processor is configured to perform the post-processing of the vector of derivatives by limiting derivatives' moduli with an upper limit $\dot{x}_{max}$:

$$\dot{x}_{max} = \beta \cdot \max\left\{\frac{|U|_{max}}{L_{min}}, \frac{|I|_{max}}{C_{min}}\right\}$$

wherein $|U|_{max}$ and $|I|_{max}$ are the steady-state peak values of capacitor voltage and inductor current of the system, Lmin and Cmin are minimum values of equivalent inductance and equivalent capacitance, and is a limiting factor.

11. The power electronics simulation computation apparatus according to claim 7, wherein the processor is configured to determine the time of the k+1-th simulation step by:

determining the occurrence times of events, and selecting the earliest time as a time stamp for the k+1-th simulation step, wherein the events include state variable events and non-state variable events, the state variable events include state variable $x_i$ reaching the quantized value at the k+1-th step, $Q_i^{(k+1)}$ and the occurrence times of the state variable events are calculated based on the vector of derivatives, the non-state variable events include one or more of the following events: inputs or loads changing, open or closed loop system sending switch instructions, turn-on process or turn-off process of uncontrolled devices, and transient processes of switches.

12. A non-transitory computer-readable storage medium having stored thereon program codes which when executed by one or more processors cause the one or more processors to perform a backward discrete state event driven power electronics simulation method comprising:

simulation initialization and a k-th simulation step, wherein the k-th simulation step includes:

obtaining a system state equation at the k-th step;

determining two alternative quantized values for each of state variables at a k+1-th step, the state variables include capacitor voltage and inductor current;

setting up a finite state machine to determine quantized values for the state variables at the k+1-th step one by one, wherein the quantized value for each state variable is determined as one of the two alternative quantized values for that state variable, including:

setting up a finite state machine including four states, and in each state, dynamically decoupling and reducing the dimensionality of the system based on extrema of derivatives, a Jacobian matrix of the system state equation, and independent variables' impact on the extrema, so as to determine the quantized values for the state variables at the k+1-th step one by one;

calculating a vector of derivatives based on the quantized values at the k+1-th step and the system state equation, wherein the program codes when executed by one or more processors cause the one or more processors to calculate the vector of derivatives by:

substituting the quantized values at the k+1-th step to the system state equation instead of the state variables to calculate the vector of derivatives; and post-processing the calculated vector of derivatives, wherein the derivatives' moduli are limited based on electrical stress of the power electronics system; and determining the time of the k+1-th simulation step based on occurrence times of events.

13. The non-transitory computer-readable storage medium according to claim 12, wherein the program codes when executed by one or more processors cause the one or more processors to perform the post-processing of the vector of derivatives by limiting derivatives' moduli with an upper limit $\dot{x}_{max}$:

$$\dot{x}_{max} = \beta \cdot \max\left\{\frac{|U|_{max}}{L_{min}}, \frac{|I|_{max}}{C_{min}}\right\}$$

wherein $|U|_{max}$ and $|I|_{max}$ are the steady-state peak values of capacitor voltage and inductor current of the system, Lmin and Cmin are minimum values of equivalent inductance and equivalent capacitance, and β is a limiting factor.

14. The non-transitory computer-readable storage medium according to claim 12, wherein the program codes when executed by one or more processors cause the one or more processors to determine the time of the k+1-th simulation step by:

determining the occurrence times of events, and selecting the earliest time as a time stamp for the k+1-th simulation step, wherein the events include state variable events and non-state variable events, the state variable events include state variable $x_i$ reaching the quantized value at the k+1-th step, $Q_i^{(k+1)}$ and the occurrence times of the state variable events are calculated based on the vector of derivatives, the non-state variable events include one or more of the following events: inputs or loads changing, open or closed loop system sending switch instructions, turn-on process or turn-off process of uncontrolled devices, and transient processes of switches.

* * * * *